(12) United States Patent
Blessing et al.

(10) Patent No.: US 11,077,726 B2
(45) Date of Patent: Aug. 3, 2021

(54) FRONT AXLE ROTARY JOINT ASSEMBLY AND THE TIRE INFLATION SYSTEM MADE THEREWITH

(71) Applicant: Dana Automotive Systems Group, LLC, Maumee, OH (US)

(72) Inventors: Christopher D. Blessing, Toledo, OH (US); Seth A. Metzger, Monclova, OH (US); Jason M. Sidders, Perrysburg, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 509 days.

(21) Appl. No.: 16/024,148

(22) Filed: Jun. 29, 2018

(65) Prior Publication Data
US 2019/0001762 A1 Jan. 3, 2019

Related U.S. Application Data

(60) Provisional application No. 62/527,132, filed on Jun. 30, 2017.

(51) Int. Cl.
*B60C 23/00* (2006.01)
*B60C 29/06* (2006.01)

(52) U.S. Cl.
CPC .......... *B60C 23/003* (2013.01); *B60C 29/06* (2013.01)

(58) Field of Classification Search
CPC ..... B60C 23/003; B60C 29/06; B60B 35/003; B60B 35/16; B60B 35/163
See application file for complete search history.

(56) References Cited

U.S. PATENT DOCUMENTS

| 2,693,841 | A | * | 11/1954 | Webster, Jr. | .......... B60C 23/003 |
| | | | | | 152/417 |
| 4,598,820 | A | | 7/1986 | Murphy | |
| 4,804,027 | A | * | 2/1989 | Runels | .................. B60C 23/003 |
| | | | | | 152/417 |
| 5,221,381 | A | * | 6/1993 | Hurrell, II | ............ B60C 23/003 |
| | | | | | 152/416 |

(Continued)

FOREIGN PATENT DOCUMENTS

| CN | 202641270 U | 1/2013 |
| EP | 1744911 A1 | 1/2007 |

(Continued)

*Primary Examiner* — Scott A Browne
(74) *Attorney, Agent, or Firm* — Marshall & Melhorn, LLC

(57) ABSTRACT

An axle assembly having a constant shaft disposed at least partially through a bearing hub assembly. The constant shaft defines a fluid conduit therethrough. A steering knuckle is disposed at least partially about the constant shaft. The axle assembly may include a bearing spacer disposed about the constant shaft, the bearing spacer being disposed at least partially axially between the bearing hub assembly and the steering knuckle. Additionally, a first rotary seal and a second rotary seal may be disposed radially between the bearing spacer and the constant shaft. The first and second rotary seals may at least partially define a fluid chamber in fluid communication with the constant shaft fluid conduit. Further, a port may be disposed through the bearing spacer, wherein the port is in fluid communication with the fluid chamber.

12 Claims, 8 Drawing Sheets

(56) References Cited

U.S. PATENT DOCUMENTS

| | | | | |
|---|---|---|---|---|
| 5,587,698 | A * | 12/1996 | Genna | B60C 23/003 |
| | | | | 340/442 |
| 6,182,727 | B1 | 2/2001 | Beesley | |
| 6,283,186 | B1 | 9/2001 | Krisher | |
| 6,325,123 | B1 | 12/2001 | Gao et al. | |
| 6,363,985 | B1 | 4/2002 | Beesley | |
| 6,668,888 | B1 * | 12/2003 | Beesley | B60C 23/003 |
| | | | | 152/415 |
| 7,302,979 | B2 | 12/2007 | Davison et al. | |
| 7,454,966 | B2 * | 11/2008 | Fujioka | B60C 23/0408 |
| | | | | 73/146.5 |
| 9,162,539 | B2 * | 10/2015 | Hibbler | B60B 27/0047 |
| 9,908,373 | B2 | 3/2018 | Hennig | |
| 10,807,413 | B2 * | 10/2020 | Balistreri | B60B 35/163 |
| 2015/0107742 | A1 * | 4/2015 | Knapke | B60C 23/10 |
| | | | | 152/416 |
| 2016/0361957 | A1 | 12/2016 | Burke et al. | |
| 2017/0120697 | A1 | 5/2017 | Hennig | |
| 2018/0022170 | A1 | 1/2018 | Hennig | |
| 2018/0037071 | A1 | 2/2018 | Musgrave et al. | |
| 2018/0215201 | A1 * | 8/2018 | Balistreri | B60B 35/003 |

FOREIGN PATENT DOCUMENTS

| | | |
|---|---|---|
| EP | 3265329 A1 | 1/2018 |
| GB | 191124752 A | 4/1912 |
| JP | 05077094 A | 3/1993 |

* cited by examiner

FRONT AXLE ROTARY JOINT ASSEMBLY AND THE TIRE INFLATION SYSTEM MADE THEREWITH

BACKGROUND

The present disclosure relates to tire inflation systems and more particularly to a steer axle wheel assembly utilized in a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire longevity. Furthermore, tire inflation systems increase a vehicle's maneuverability over differing terrains, and increase a vehicle's mobility through varying environmental conditions. Additionally, tire inflation systems reduce maintenance requirements.

Tire inflation systems communicate pressurized fluid to a wheel assembly. Conventional tire inflation systems are limited by their package size. In view of the above, there remains a need for a tire inflation system operable in a decreased package size.

SUMMARY

In one form, the present disclosure provides for an axle assembly having a constant shaft disposed at least partially through a bearing hub assembly. The constant shaft defines a fluid conduit therethrough. A steering knuckle is disposed at least partially about the constant shaft. The axle assembly may include a bearing spacer disposed about the constant shaft, the bearing spacer being disposed at least partially axially between the bearing hub assembly and the steering knuckle. Additionally, a first rotary seal and a second rotary seal may be disposed radially between the bearing spacer and the constant shaft. The first and second rotary seals may at least partially define a fluid chamber in fluid communication with the constant shaft fluid conduit. Further, a port may be disposed through the bearing spacer, wherein the port is in fluid communication with the fluid chamber.

In another form, the present disclosure provides for an axle assembly including a steering knuckle having a bearing spacer, a brake spacer, and one or more dust shield spacers formed unitary therewith. A constant shaft may be disposed at least partially through the steering knuckle, wherein the constant shaft defines a fluid conduit therethrough. A first rotary seal and a second rotary seal may be disposed radially between the bearing spacer and the constant shaft. The first and second rotary seals at least partially define a fluid chamber in fluid communication with the constant shaft fluid conduit. Further, a port may be disposed through the bearing spacer, wherein the port is in fluid communication with the fluid chamber.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
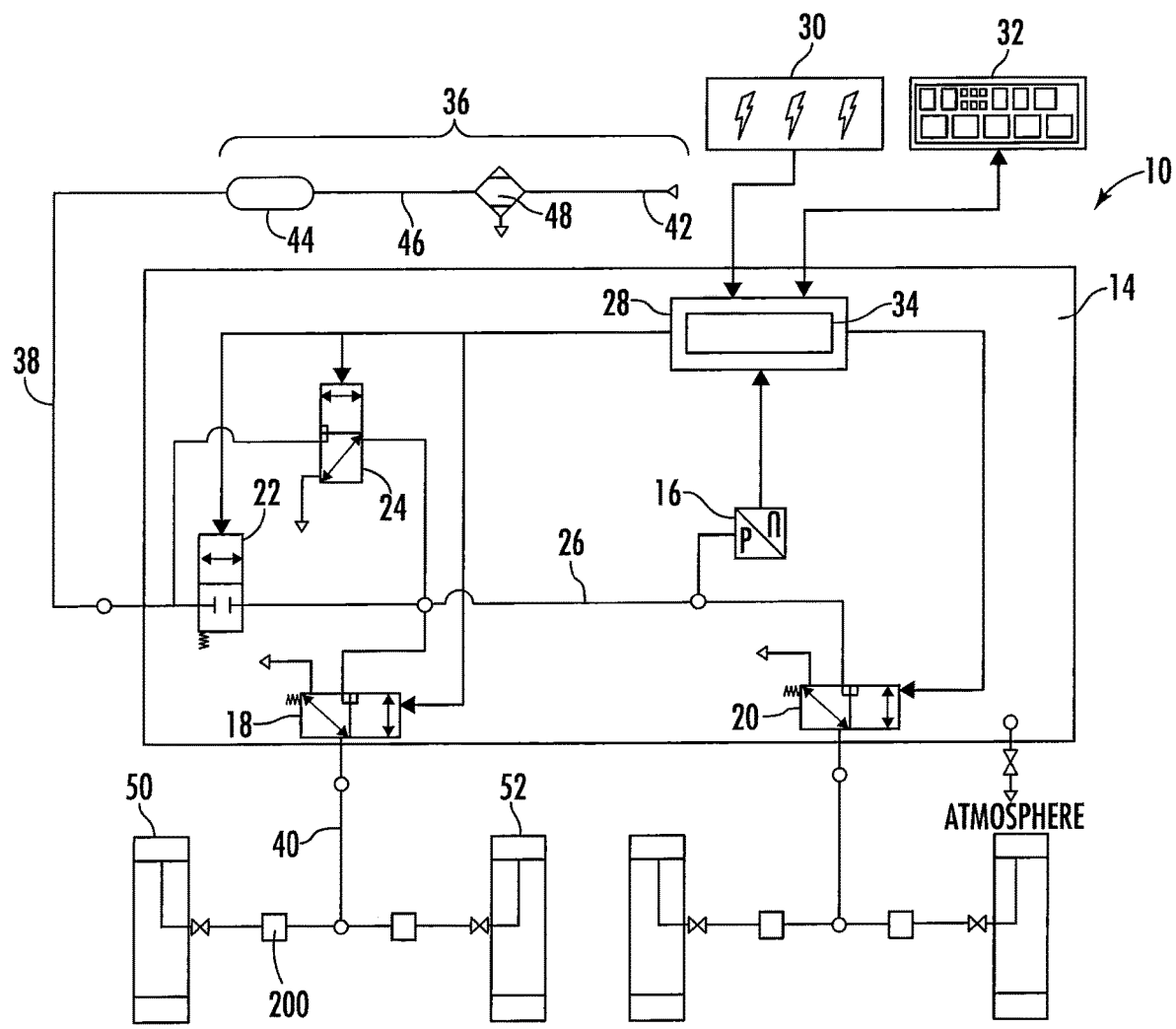
FIG. 1 illustrates a schematic view of a tire inflation system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. In certain embodiments, the tire inflation system 10 is utilized with a vehicle (not depicted). The tire inflation system 10 may be a central tire inflation system (CTIS) for a compact or mid-size sport utility vehicle. In addition, the tire inflation system 10 described herein may have applications in both light duty and heavy duty vehicles, and for passenger, commercial, and off-highway vehicles. It would be understood by one of ordinary skill in the art that the tire inflation system 10 also has industrial, locomotive, military, agricultural, and aerospace applications.

The tire inflation system 10 is described herein with reference to a pressurized fluid such as, for example, air. The tire inflation system 10 may have inflate and/or deflate capability to allow a tire pressure to be increased and/or decreased.

As illustrated in FIG. 1, the tire inflation system 10 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first control unit conduit 26 for controlling the flow of, and directing, air through the system 10.

It will be understood by those skilled in the art that the control unit 14 may comprise a mechatronic control unit (MCU) or a pneumatic control unit (PCU), but is not limited thereto.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first control unit conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 10 will be described below with reference to the tire pressure of one tire 50. However, the tire inflation system 10 may at certain times be in fluid communication with a plurality of tires.

The tire inflation system 10 further comprises a wheel end assembly 200. The wheel end assembly 200 is associated with the tire 50. The wheel end assembly 200 is utilized, inter alia, to transfer pressurized air between portions of the tire inflation system 10. It is to be understood that, except where expressly specified to the contrary, the communication of pressurized fluid between the components described herein is facilitated by the sealing of all pressurized fluid flow paths. For example, in an area of fluid communication between components, the components may be sealed via an interference fit between said components or a third component; the components may alternatively be sealed via a static elastomeric seal or a rotary seal.

As illustrated in FIGS. 2-5, in an embodiment, the wheel end assembly 200 comprises a bearing hub assembly 210. The bearing hub assembly 210 includes an inner bearing flange 212. A radially inner surface 214 of the inner bearing flange 212 defines a plurality of splines 216 for engaging complimentary splines 220 on a constant shaft 218. The constant shaft 218 comprises a spindle portion 218A, a spacer portion 218B, and a yoke portion 218C. A threaded nut 221 may be disposed about an outboard end of the constant shaft spindle 218A to retain the axial position of the inner bearing flange 212 thereon. The nut 221 may threadedly engage the constant shaft spindle 218A and abut an outboard surface of the inner bearing flange 212.

In an embodiment, an inner race 222 of the bearing hub assembly 210 is disposed about, and coupled for rotation with, the inner bearing flange 212. The inner race 222 may be positioned in an annular recess defined by a radially projecting flange 224 and a shoulder 226 of the inner bearing flange 212. The flange 224 is disposed at an inboard end of the inner bearing flange 212. The shoulder 226 is defined by portions of the inner bearing flange 212 having different outer diameters.

Figure 2:
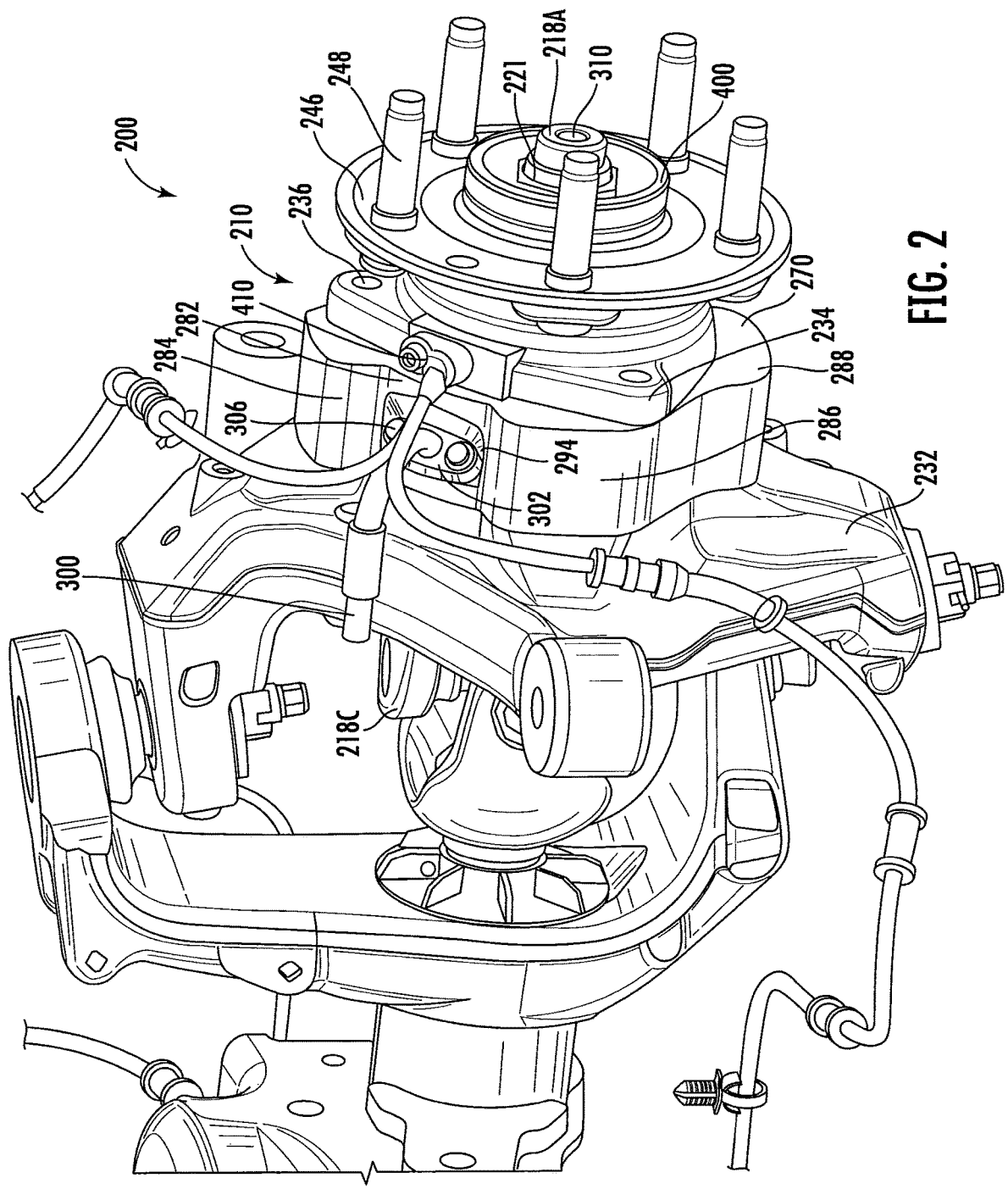
FIG. 2 illustrates an isometric view of an embodiment of a wheel end assembly of the tire inflation system of FIG. 1 according to an embodiment of the presently disclosed subject matter.
Figure 3:
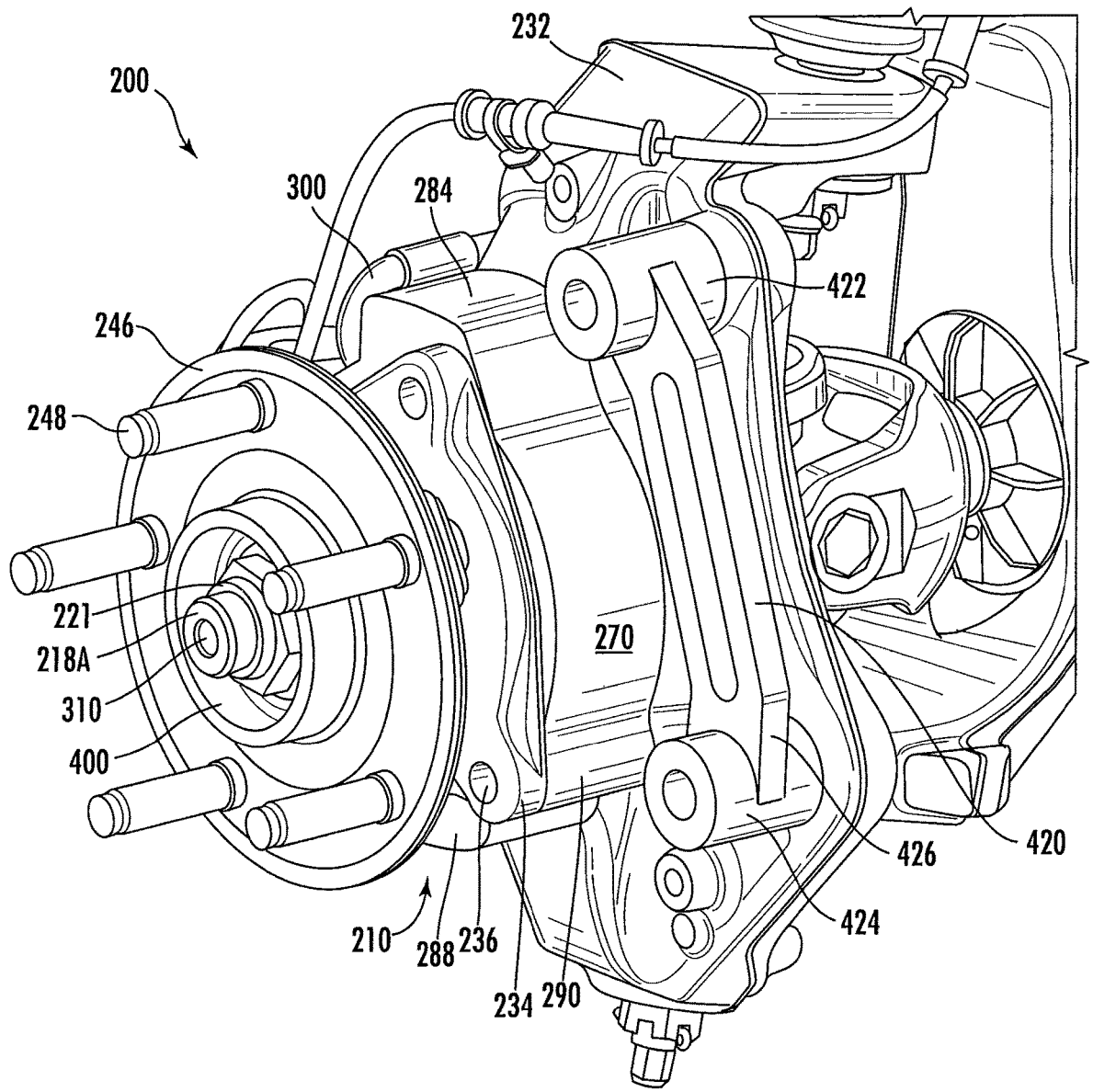
FIG. 3 illustrates another isometric view of the wheel end assembly of FIG. 2.

A first rotary oil seal 228 is sealingly engaged between the inner race 222 and an outer bearing flange 230 at an inboard end of the bearing hub assembly 210. The outer bearing flange 230 is radially disposed about the inner race 222 and the inner bearing flange 212. As illustrated in FIGS. 2 and 3, in an embodiment, the outer bearing flange 230 comprises three ears 234 disposed about the outer surface thereof. The ears 234 may be equilaterally disposed about the outer bearing flange 230. Further, each ear 234 includes an aperture 236 therethrough. Mechanical fasteners (not depicted) are disposed through each ear aperture 236 to couple the outer bearing flange 230 with a bearing spacer 270 (discussed intra). A wheel speed sensor 410 is disposed through a portion of the outer bearing flange 230. The wheel speed sensor 410 cooperates with a tone ring 412 disposed about the inner bearing flange 212 between the first and second rolling elements 242, 244.

Figure 5:
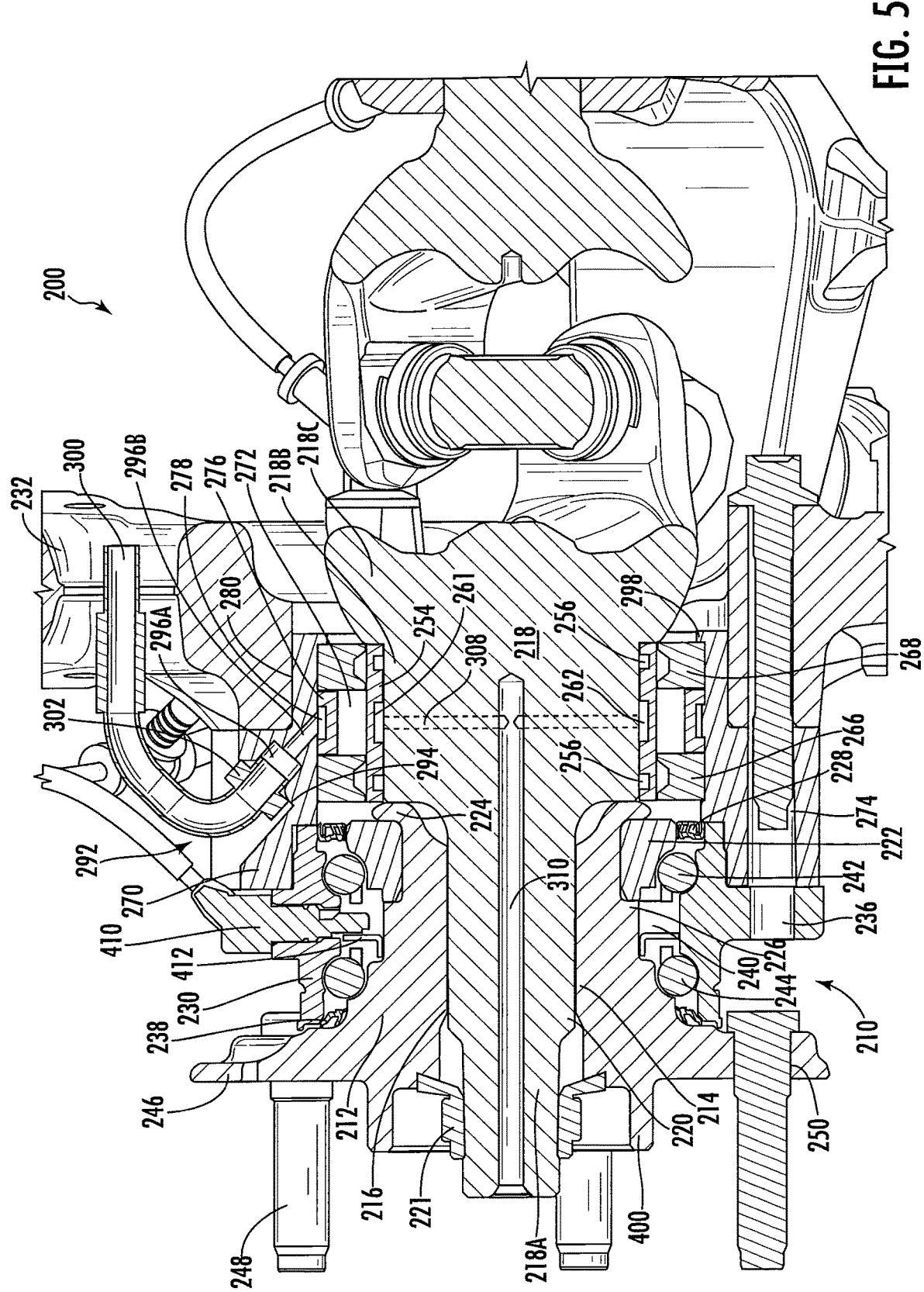
FIG. 5 illustrates a cross-sectional view of the wheel end assembly of FIG. 2.

As illustrated in FIG. 5, a second rotary oil seal 238 is sealingly engaged between a portion the inner bearing flange 212 and a portion of the outer bearing flange 230 at an outboard end of the bearing assembly 210. The first and second rotary oil seals 228, 238, the inner race 222, the inner bearing flange 212, and the outer bearing flange 230 define an annular chamber 240 therebetween. Bearing lubricant may be located in the chamber 240.

A first rolling element 242 is disposed adjacent to an outboard side of the first rotary seal 228. The first rolling element 242 is disposed about the inner race 222, between the inner race 222 and the outer bearing flange 230. A second rolling element 244 is disposed about the inner bearing flange 212, between the inner bearing flange 212 and the outer bearing flange 230. In an embodiment, the first and second rolling elements 242, 244 may comprise a plurality of balls.

The inner bearing flange 212 further comprises a flange 246 located at an outboard end thereof. The outboard flange 246 includes a plurality of axially extending apertures 250 therethrough. A plurality of studs 248 are disposed in the apertures 250 by which a wheel and/or a rotor (not depicted) may be coupled with the bearing hub assembly 210.

Figure 4:
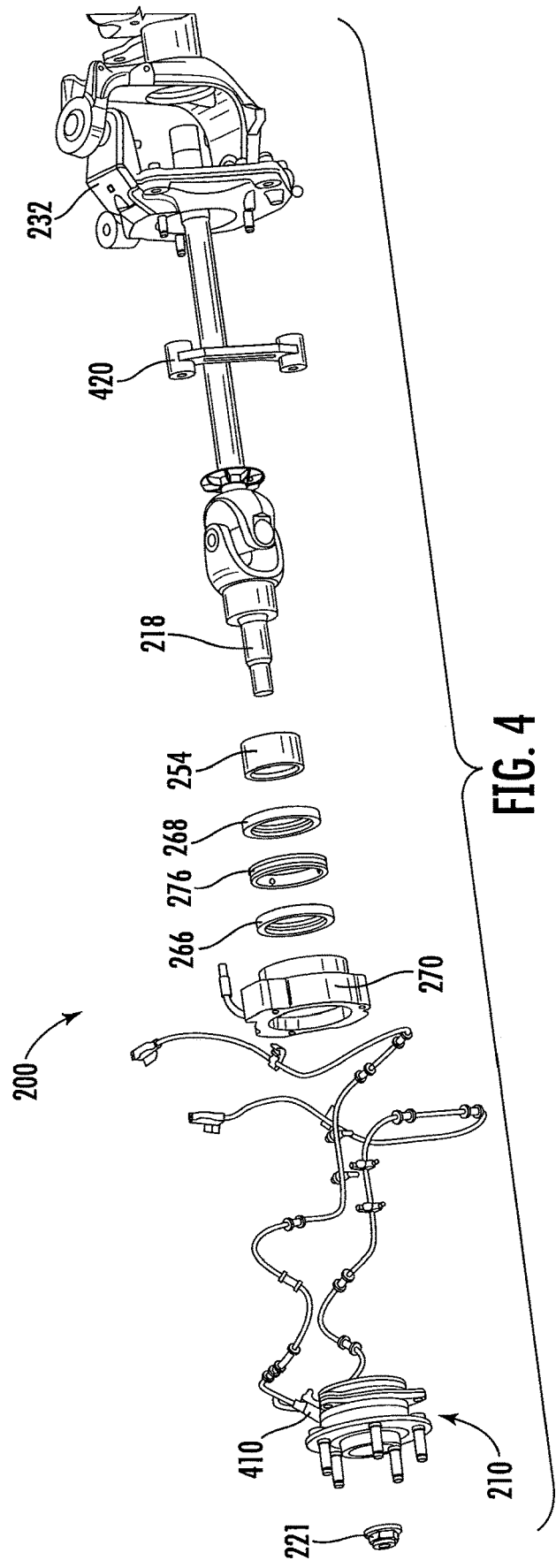
FIG. 4 illustrates an exploded view of the wheel end assembly of FIG. 2.
Figure 8:
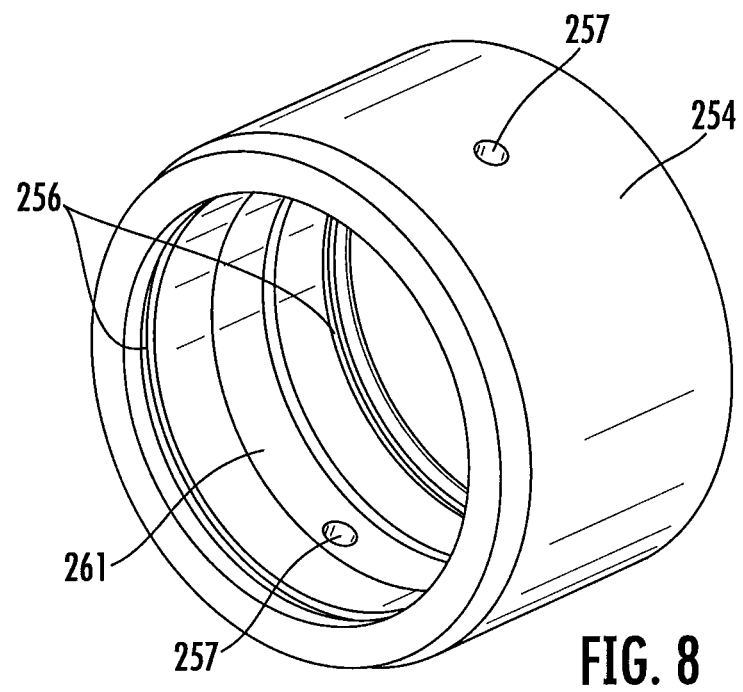
FIG. 8 illustrates an isometric view of another portion of the wheel end assembly of FIG. 6.

As illustrated in FIGS. 4 and 5, in an embodiment, the wheel end assembly 200 further comprises a sleeve 254 disposed about the constant shaft spacer portion 218B for rotation therewith. In an embodiment, the sleeve 254 is press fit to the constant shaft spacer portion 218B. As illustrated in FIGS. 5 and 8, the sleeve 254 may comprise annular grooves 256 disposed in the radially inner surface thereof. Seals (not depicted), such as O-rings, may be disposed in the annular grooves 256 to sealingly couple the sleeve 254 with a surface of the constant shaft spacer portion 218B. Additionally, the sleeve 254 may define an annular recess 261 disposed axially between said annular grooves 256. A first annular fluid chamber 262 is defined by the annular recess 261 of the sleeve 254 and the constant shaft spacer portion 218B.

A first rotary seal 266 and a second rotary seal 268 are disposed about the sleeve 254. The first and second rotary seals 266, 268 are disposed radially between the sleeve 254 and the bearing spacer 270. The bearing spacer 270 defines fastener apertures 274 coaxially aligned with the outer bearing flange fastener apertures 236. Fasteners (not depicted) disposed through fastener apertures 274, 236 are utilized to couple the bearing hub assembly 210 and the bearing spacer 270 with a steering knuckle 232.

A seal spacer 276 is disposed axially between the first and second rotary seals 266, 268. In an embodiment, the seal spacer 276 may be press-fit onto an inner surface of the bearing spacer 270. The sleeve 254, the first and second rotary seals 266, 268, and the seal spacer 276 define a second annular fluid chamber 272. The second annular fluid chamber 272 is in fluid communication with the first annular fluid chamber 262 via one or more apertures 257 radially disposed through the sleeve 254. In an embodiment, four apertures are disposed through the sleeve 254 to facilitate fluid communication between the first and second annular fluid chambers 262, 272. The seal spacer 276 and the inner surface of the bearing spacer 270 define a third annular fluid chamber 278. The third annular fluid chamber 278 is in fluid communication with the second annular fluid chamber 272 via a plurality of apertures (not depicted) radially disposed through the seal spacer 276. In an embodiment, four apertures are disposed through the seal spacer 276 to facilitate fluid communication between the second and third annular fluid chambers 272, 278.

As illustrated in FIGS. 2, 3, and 5, the bearing spacer 270 comprises an annular geometry including a first radially outer surface 280 and a second radially outer surface 282 having a diameter greater than the first radially outer surface 280. The second radially outer surface 282 may comprise a diameter variable in size. The bearing spacer 270 also includes a first radially projecting portion 284 disposed at an upper portion of the second radially outer surface 282. The first projecting portion 284 aligns with a corresponding upper portion of the steering knuckle 232. The bearing spacer 270 further includes a second radially projecting portion 286 disposed at a side portion of the second radially outer surface 282. The second projecting portion 286 aligns with a corresponding side portion of the steering knuckle 232. A third radially projecting portion 288 is disposed at a lower portion of the second radially outer surface 282. The third projecting portion 288 aligns with a corresponding lower portion of the steering knuckle 232, As illustrated in FIG. 3, one or more of the fastener apertures 274 may be disposed in radially projecting portions 290 for alignment with the fastener apertures 236 of the outer bearing flange 230. As illustrated in FIGS. 2 and 3, one or more of the fastener apertures 274 may be disposed in the first and second radially projecting portions 284, 286. In an embodiment, the bearing spacer 270 comprises three fastener apertures 274; one of the fastener apertures 274 disposed through the radially projecting portion 290, and one of the fastener apertures 274 disposed through each of the first and second radially projecting portions 284, 286.

The bearing spacer second radially outer surface 282 defines a port 292 therein. The port 292 comprises an outboard angled surface 294. A fluid channel 296 is disposed through the bearing spacer port angled surface 294 and is in fluid communication with the third annular fluid chamber 278. The fluid channel 296 has a longitudinal axis disposed transverse to the port angled surface 294. The fluid channel 296 further comprises a first diameter portion 296A and a second diameter portion 296B. The first diameter portion 296A is disposed adjacent to the port angled surface 294 and is larger than the second diameter portion 296B.

The bearing spacer 270 also comprises a radially inward extending flange 298. The flange 298 facilitates the axial location of the second rotary seal 268. The bearing spacer first outer surface 280 is disposed radially within the steering knuckle 232. An inboard facing surface of the bearing spacer 270 defined by the first and second outer surfaces 280, 282 abuts an outboard facing surface of the steering knuckle 232 to axially locate the bearing spacer 270. An outboard portion of the bearing spacer 270 is disposed about an outer surface of the outer bearing flange 230.

A fluid conduit 300 in fluid communication with the fluid reservoir 36 is sealingly coupled with the bearing spacer port angled surface 294 for fluid communication with the fluid channel 296. A flange 302 having one or more fastener apertures (not depicted) therethrough may be disposed about the fluid conduit 300. Fasteners 306 disposed through the one or more fastener apertures may be utilized to couple the flange 302 with the angled surface 294. In an embodiment, the fluid conduit 300 may comprise a tube.

During inflation of the tire 50, pressurized fluid is communicated from the fluid conduit 300 to the fluid channel 296 in the bearing spacer 270. From the fluid channel 296, pressurized fluid is communicated to the third annular fluid chamber 278. Through apertures in the seal spacer 276, pressurized fluid is communicated to the second annular fluid chamber 272. Through apertures in the sleeve 254, pressurized fluid is transferred to the first annular fluid chamber 262. One or more generally transverse fluid channels 308 are disposed in the constant shaft 218. The one or more fluid channels 308 are in fluid communication with the first annular fluid chamber 262 and a generally longitudinally disposed central fluid channel 310 disposed through the constant shaft 218. In an embodiment, there are four of the one or more fluid conduits 308 disposed through the constant shaft 218. The central fluid channel 310 is disposed through the outboard end of the constant shaft spindle portion 218A and is in fluid communication a fluid chamber (not depicted) defined by a cover (not depicted) disposed about the constant shaft 218 and sealingly engaged with an outboard flange 400 of the inner bearing flange 212.

A hose (not depicted) may be coupled with, and in fluid communication with, the fluid chamber defined by the cover, and in selective fluid communication with the tire 50. A wheel valve (not depicted) may be disposed in the flow path between the constant shaft central fluid channel 310 and the tire 50 for selective fluid communication therebetween. The tire 50 is coupled with a rotor (not depicted). The rotor is coupled with the bearing hub assembly flange 246 via the plurality of studs 248. Persons skilled in the relevant art will recognize that the pressurized fluid may be communicated from the constant shaft central fluid channel 310 to the tire 50 via a number of conventional methods.

In another embodiment, not depicted, a coupling may be sealingly coupled with an outboard portion of the constant shaft central fluid channel 310. A hose (not depicted) is in fluid communication with the central fluid channel 310 via the coupling, and the hose is also in selective fluid communication with the tire 50.

As illustrated in FIG. 3, in an embodiment, the wheel end assembly 200 comprises a brake spacer 420. The brake spacer 420 comprises a first cylindrical portion 422 and a second cylindrical portion 424 coupled via a body 426. In other embodiments, the first and second cylindrical portion 422, 424 may comprise other geometries. The first and second cylindrical portions 422, 424 are coupled with the knuckle 232 via mechanical fasteners (not depicted). The brake spacer 420 is utilized to facilitate alignment of brake calipers (not depicted) and the rotor.

Figure 6:
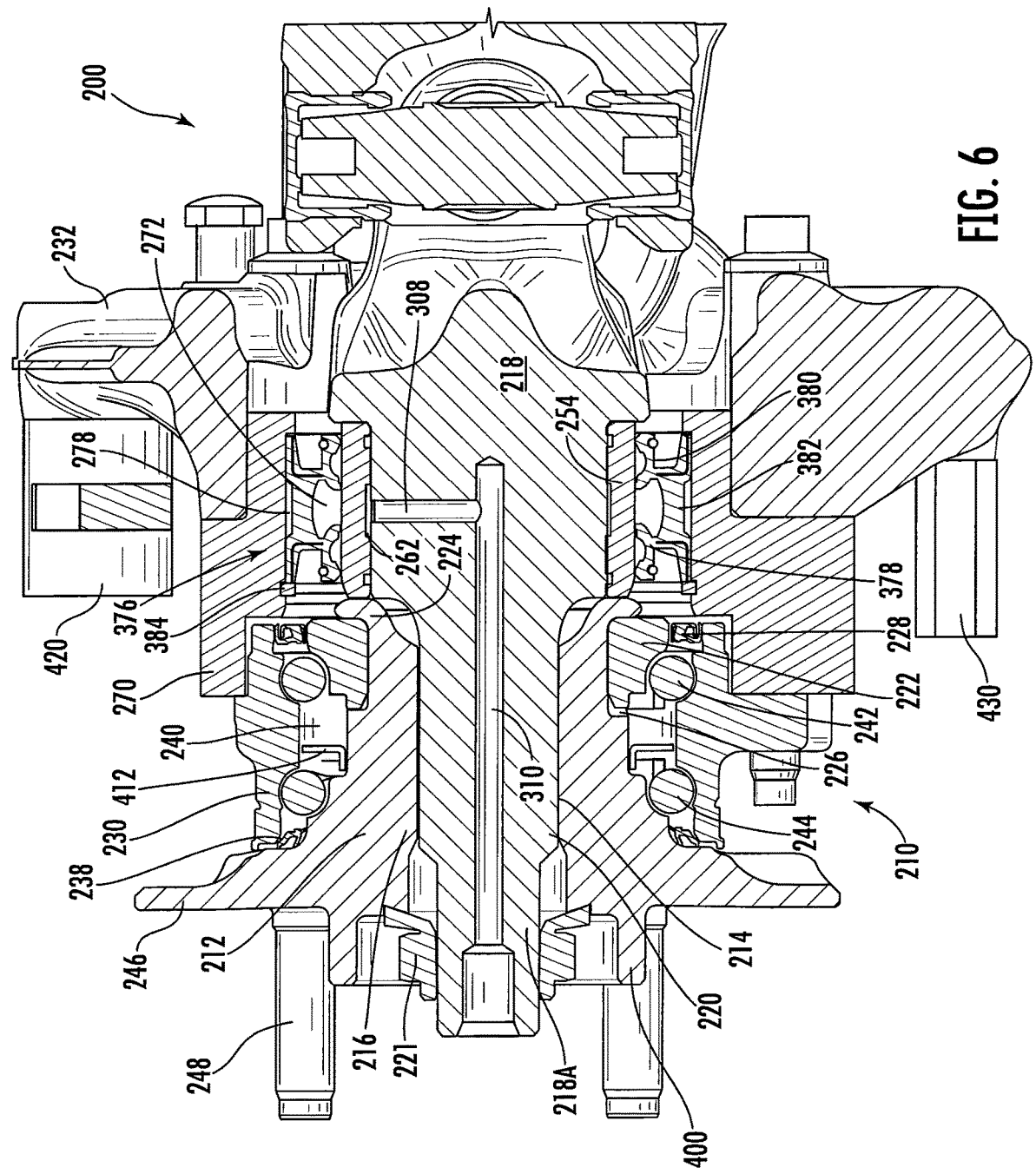
FIG. 6 illustrates a cross-sectional view of a wheel end assembly of the tire inflation system of FIG. 1 according to another embodiment of the presently disclosed subject matter.

In an embodiment, as illustrated in FIG. 6, the seal spacer 276 and the first and second rotary seals 262, 272 may be replaced by a seal assembly 376. The seal assembly 376 includes a first rotary seal 378 and a second rotary seal 380 axially separated by a unitary and integral spacer 382. As in the embodiment illustrated in FIG. 5, the sleeve 254, the first and second rotary seals 378, 380, and the spacer 382 define the second annular fluid chamber 272. One or more radially disposed apertures (not depicted) extend through the seal assembly spacer 382 to place the third annular fluid chamber 278 in fluid communication with the second annular fluid chamber 272. Referring still to FIG. 6, a snap ring 384 may be disposed at least partially within a groove in the radially inner surface of the bearing spacer 270 axially adjacent to the seal assembly 376. The snap ring 384 may be utilized to maintain the axial alignment of the seal assembly 376.

Figure 7:
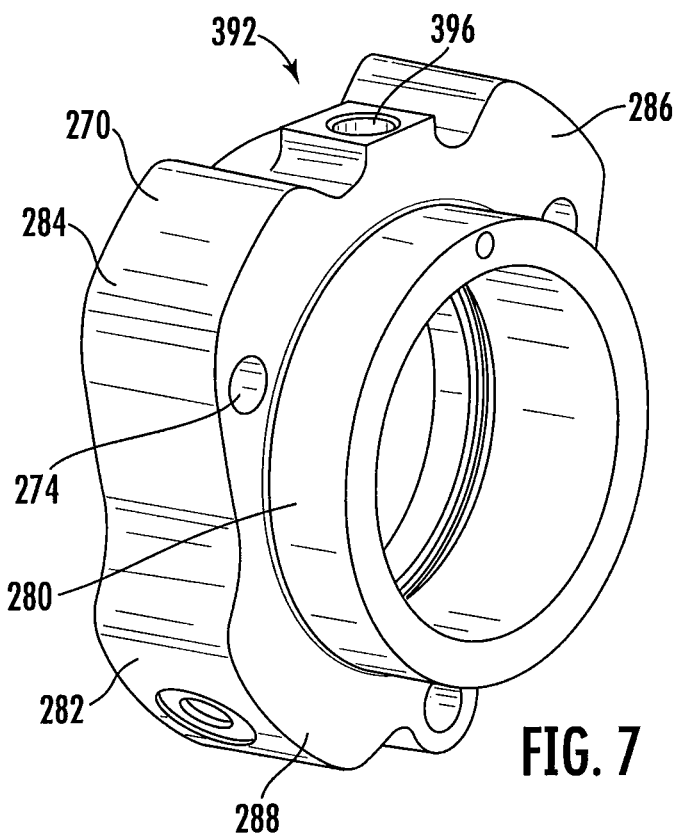
FIG. 7 illustrates an isometric view of a portion of the wheel end assembly of FIG. 6.

As illustrated in FIG. 7, in an embodiment, the bearing spacer port 292 may be replaced with a port 392. A fluid channel 396 is disposed through the bearing spacer port 392 and is in fluid communication with the third annular fluid chamber 278. In an embodiment, the port fluid channel 396 comprises a first portion that extends radially through the bearing spacer 270 transverse to a longitudinal axis thereof, and a second portion that extends from the first portion to a radially inner surface of the bearing spacer 270 at an acute angle to the longitudinal axis thereof.

Figure 9:
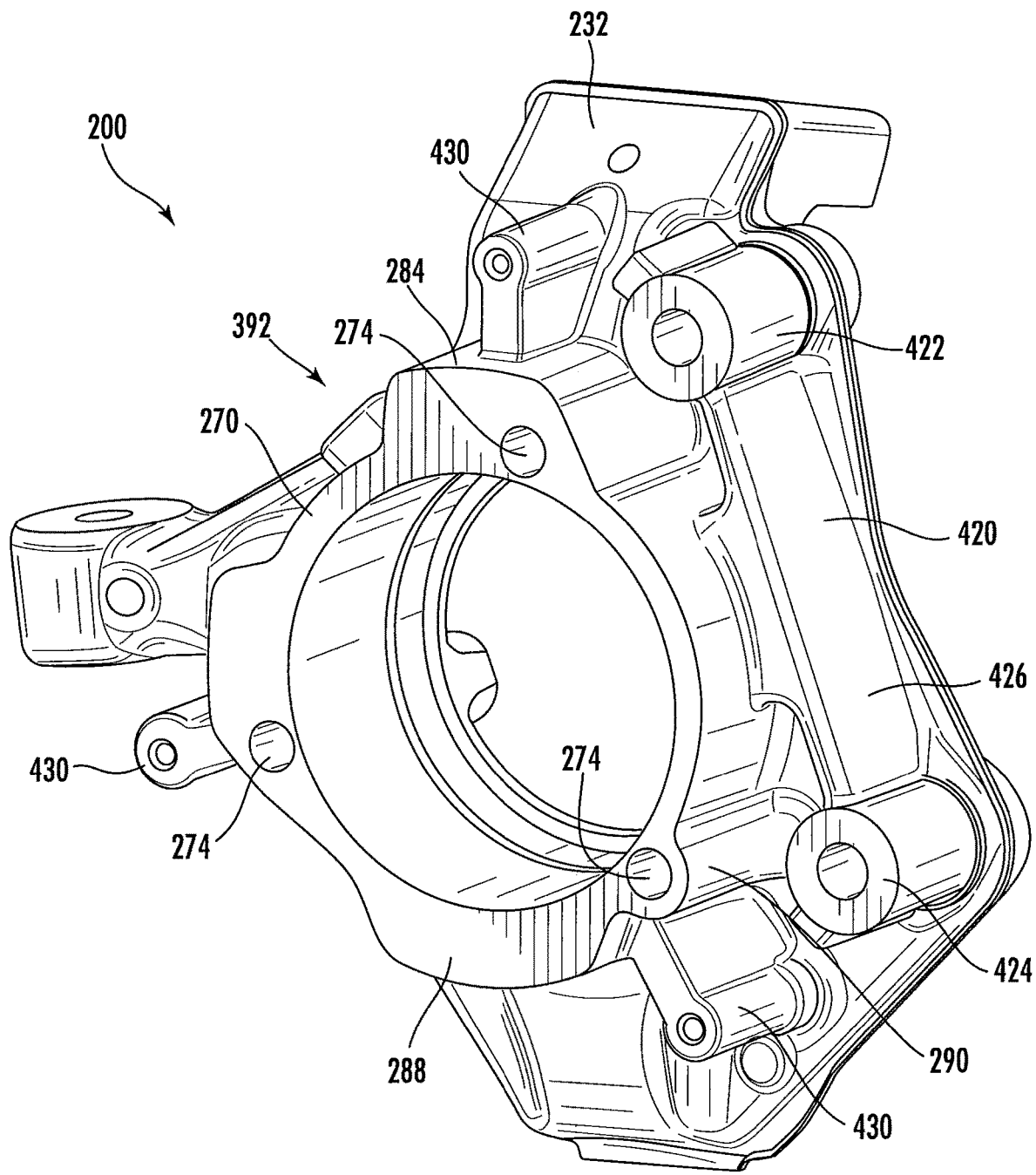
FIG. 9 illustrates an isometric view of a portion of a wheel end assembly of the tire inflation system of FIG. 1 according to yet another embodiment of the presently disclosed subject matter.

As illustrated in FIG. 9, in an embodiment, the steering knuckle 232, the bearing spacer 270, and the brake spacer 420 may be formed unitary and integral. One or more dust shield spacers 430 may also be formed unitary with the steering knuckle 232.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
    a bearing hub assembly;
    a constant shaft disposed at least partially through said bearing hub assembly, wherein said constant shaft defines a first fluid conduit therethrough, and wherein said constant shaft includes:
        a spindle portion;
        a spacer portion disposed axially adjacent to said spindle portion; and
        a yoke portion disposed axially adjacent to said spacer portion, wherein said spacer portion comprises a greater diameter than said spindle portion;
    a steering knuckle disposed at least partially about said constant shaft;
    a bearing spacer disposed about said constant shaft, wherein said bearing spacer is disposed at least partially axially between said bearing hub assembly and said steering knuckle;
    a sleeve disposed at least partially about said constant shaft spacer portion, wherein a first and a second rotary seal is in sealing engagement with said sleeve, and wherein said sleeve includes:
        a radially inner surface at least partially coupled with said constant shaft spacer portion; and
        an annular recess defined by said radially inner surface, wherein said annular recess and said constant shaft spacer portion define a first fluid chamber in fluid communication with said first fluid conduit;
    the first rotary seal disposed radially between said bearing spacer and said constant shaft;
    the second rotary seal disposed radially between said bearing spacer and said constant shaft, wherein said first and second rotary seals at least partially define a second fluid chamber influid communication with said first fluid conduit; and
    a port disposed through said bearing spacer, wherein said port is in fluid communication with said second fluid chamber.

2. The axle assembly according to claim 1, wherein said constant shaft further comprises:
    said first fluid conduit disposed through a radially outer surface of said constant shaft; and
    a second fluid conduit disposed through an outboard end of said constant shaft, wherein said second fluid conduit is disposed coaxially with said constant shaft, and wherein said second fluid conduit is in fluid communication with said first fluid conduit.

3. The axle assembly according to claim 1, further comprising:
    a spacer disposed axially between said first rotary seal and said second rotary seal, wherein said spacer defines one or more apertures therethrough.

4. The axle assembly according to claim 1, wherein said bearing hub assembly further comprises:
    an outer bearing flange at least partially disposed radially within said bearing spacer.

5. The axle assembly according to claim 1, wherein said bearing spacer further comprises:
    a first radially outer surface, wherein said first radially outer surface is disposed at least partially radially within said steering knuckle; and
    a second radially outer surface having a greater diameter than said first radially outer surface.

6. The axle assembly according to claim 5, wherein said bearing spacer port is disposed through said second radially outer surface.

7. The axle assembly according to claim 6, wherein said bearing spacer port further comprises:
   a first fluid conduit disposed radially through said second radially outer surface; and
   a second fluid conduit disposed through said bearing spacer, whereby said first fluid conduit of the bearing spacer is in fluid communication with said second fluid chamber.

8. The axle assembly according to claim 6, wherein said bearing spacer port is disposed at an acute angle to a longitudinal axis of said bearing spacer.

9. The axle assembly according to claim 5, wherein said bearing spacer further comprises:
   a radially inward extending flange disposed at an inboard end of said bearing spacer.

10. The axle assembly according to claim 1, further comprising:
    a snap ring at least partially disposed in a radially inner surface of said bearing spacer, wherein said snap ring is disposed outboard of said first rotary seal.

11. The axle assembly according to claim 1, further comprising:
    a tube coupled with said bearing spacer port, whereby said bearing spacer port is in fluid communication with a fluid reservoir.

12. An axle assembly, comprising:
    a steering knuckle, comprising:
      a bearing spacer formed unitary with said steering knuckle;
      a brake spacer formed unitary with said steering knuckle;
      one or more dust shield spacers formed unitary with said steering knuckle;
    a constant shaft disposed at least partially through said steering knuckle, wherein said constant shaft defines a fluid conduit therethrough, and wherein said constant shaft includes:
      a spindle portion;
      a spacer portion disposed axially adjacent to said spindle portion; and
      a yoke portion disposed axially adjacent to said spacer portion, wherein said spacer portion comprises a greater diameter than said spindle portion;
    a sleeve disposed at least partially about said constant shaft spacer portion, wherein a first and a second rotary seal is in sealing engagement with said sleeve, and wherein said sleeve includes:
      a radially inner surface at least partially coupled with said constant shaft spacer portion; and
      an annular recess defined by said radially inner surface, wherein said annular recess and said constant shaft spacer portion define a first fluid chamber in fluid communication with said fluid conduit
    the first rotary seal disposed radially between said bearing spacer and said constant shaft;
    the second rotary seal disposed radially between said bearing spacer and said constant shaft, wherein said first and second rotary seals at least partially define a second fluid chamber in fluid communication with said fluid conduit; and
    a port disposed through said bearing spacer, wherein said port is in fluid communication with said second fluid chamber.

* * * * *